(12) United States Patent
Zhu et al.

(10) Patent No.: US 11,153,157 B2
(45) Date of Patent: Oct. 19, 2021

(54) CONFIGURATION MANAGEMENT USING OVSDB PROTOCOL

(71) Applicant: Stellar Cyber, Inc., Santa Clara, CA (US)

(72) Inventors: Yufeng Zhu, Campbell, CA (US); Xin Wang, Cupertino, CA (US)

(73) Assignee: Stellar Cyber, Inc., Santa Clara, CA (US)

( * ) Notice: Subject to any disclaimer, the term of this patent is extended or adjusted under 35 U.S.C. 154(b) by 13 days.

(21) Appl. No.: 16/298,827

(22) Filed: Mar. 11, 2019

(65) Prior Publication Data

US 2019/0280924 A1 Sep. 12, 2019

Related U.S. Application Data

(60) Provisional application No. 62/641,698, filed on Mar. 12, 2018.

(51) Int. Cl.
*H04L 12/24* (2006.01)
*H04L 12/931* (2013.01)
*H04L 12/715* (2013.01)
*G06F 9/455* (2018.01)

(52) U.S. Cl.
CPC ...... *H04L 41/0813* (2013.01); *G06F 9/45558* (2013.01); *H04L 41/0893* (2013.01); *H04L 45/64* (2013.01); *H04L 49/70* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 7,143,153 | B1* | 11/2006 | Black | H04L 41/0681 709/223 |
| 9,306,806 | B1* | 4/2016 | Zhang | H04L 41/0853 |
| 2002/0116485 | A1* | 8/2002 | Black | H04L 63/083 709/223 |
| 2010/0202450 | A1* | 8/2010 | Ansari | H04L 12/2814 370/389 |
| 2015/0052262 | A1* | 2/2015 | Chanda | H04L 61/2015 709/245 |

(Continued)

OTHER PUBLICATIONS

Pfaff et al., The Open vSwitch Database Management Protocol. RFC 7047. Dec. 2013. (Year: 2013).*

(Continued)

*Primary Examiner* — Scott B Christensen
(74) *Attorney, Agent, or Firm* — Stellar Cyber IP Legal (57) ABSTRACT

A system for configuration management using OVSDB protocol. The system includes a configuration manager on a server computer and a plurality of devices on a plurality of computing devices. The configuration manager comprises an OVSDB server maintaining an OVSDB database. Each of the plurality of devices includes an OVSDB client. The OVSDB database on the configuration manager comprises a database schema containing configuration data for the plurality of devices. The OVSDB server on the configuration manager communicates with the OVSDB client on each of the plurality of devices via OVSDB protocol in managing configurations of the plurality of devices.

19 Claims, 3 Drawing Sheets

(56) References Cited

U.S. PATENT DOCUMENTS

| | | | |
|---|---|---|---|
| 2015/0095468 A1* | 4/2015 | Benny | G06F 9/44505 |
| | | | 709/220 |
| 2015/0379150 A1* | 12/2015 | Duda | G06F 16/955 |
| | | | 707/736 |
| 2016/0112317 A1* | 4/2016 | Hood | H04L 49/25 |
| | | | 370/392 |
| 2017/0034053 A1* | 2/2017 | Chanda | H04L 45/586 |
| 2017/0063608 A1* | 3/2017 | Wang | H04L 45/44 |
| 2017/0078158 A1* | 3/2017 | Dec | G06F 11/30 |
| 2017/0093646 A1* | 3/2017 | Chanda | H04L 41/044 |
| 2017/0163536 A1* | 6/2017 | Shen | H04L 47/125 |
| 2017/0171077 A1* | 6/2017 | Chanda | H04L 45/42 |
| 2017/0272317 A1* | 9/2017 | Singla | H04L 41/0806 |

OTHER PUBLICATIONS

Matt Oswalt. [SDN Protocols] Part 3—OVSDB. posted at https://oswalt.dev/2014/08/sdn-protocols-part-3-ovsdb/ on Aug. 2014. (Year: 2014).*

* cited by examiner

CONFIGURATION MANAGEMENT USING OVSDB PROTOCOL

CROSS-REFERENCE TO RELATED APPLICATIONS

This application claims the benefit of and priority to U.S. Provisional Application No. 62/641,698 filed Mar. 12, 2018, the disclosure of all of which is incorporated herein by reference in its entirety.

TECHNICAL FIELD

This application relates generally to computer networking. In particular, various embodiments of systems and methods for managing configurations of data collection and processing managed devices or programs using Open Virtual Switch Database (OVSDB) protocol are described.

BACKGROUND

In a computer network, many devices or computer software such as data sensors, data processors, or the like include configurations that define how the devices operate. For example, a data sensor or collector may include configuration data e.g. policy that instructs the collector on what data to be collected and where the collected data to be sent. The policy can be complicated and may include hundreds or even thousands of variables. Each data collector or processor may have its own configuration different from others in the network. Over time, circumstances may require that the configuration of a device or software be updated to reflect e.g. a change in the policy or an addition or deletion of a policy etc. All of these factors make it challenging to manage configurations in a scalable way, especially for a network including a large number of devices.

There is therefore a need for a system and method for managing configurations of data collection and processing devices in a scalable way. There is a particular need for a system and method for configuration management in which changes in configuration can be efficiently communicated to the affected devices with minimal disruption on the other devices in the network.

BRIEF SUMMARY

Some embodiments of the disclosure provide a system including a configuration manager on a server computer and a plurality of data collectors on a plurality of computing devices. The configuration manager comprises an OVSDB server maintaining an OVSDB database. Each of the plurality of data collectors includes an OVSDB client. The OVSDB database on the configuration manager comprises a database schema containing configuration data for the plurality of data collectors. The OVSDB server on the configuration manager communicates with the OVSDB client on each of the plurality of data collectors via the OVSDB protocol in managing configurations of the plurality of data collectors.

Some embodiments of the disclosure provide a computer-implemented method for managing configuration of a plurality of data collectors in a computer network. The method comprises creating an OVSDB server with an OVSDB database on a server computer, creating a plurality of data collectors each including an OVSDB client on a plurality of computer devices in a distributed computer network, wherein the OVSDB database on the server computer contains configuration data for the plurality of data collectors, and sending configuration data by the OVSDB server to one or more OVSDB clients on one or more data collectors using the OVSDB protocol. The method may further comprise changing configuration data in the OVSDB database applicable to one or more of the plurality of data collectors, and sending the changed configuration data by the OVSDB server to only the one or more of the plurality of data collectors affected by the change.

Some embodiments of the disclosure provide a non-transitory computer-readable medium storing program code that when executed by one or more processors, directs a computing apparatus to perform configuration management of a plurality of data collection and processing devices in a computer network. The program code comprises instructions for creating an OVSDB server with an OVSDB database on a server computer, creating a plurality of data collectors each including an OVSDB client on a plurality of computing devices in a distributed computer network, wherein the OVSDB database on the server computer contains configuration data for the plurality of data collectors. The program code further comprises instructions for sending configuration data by the OVSDB server to one or more OVSDB clients on one or more data collectors using OVSDB protocol. In some embodiments, the program code may further comprise instructions for changing configuration data in the OVSDB database applicable to one or more of the plurality of data collectors, and sending the changed configuration data by the OVSDB server to only the one or more of the plurality of data collectors affected by the change.

This Brief Summary is provided to introduce selected aspects and embodiments of this disclosure in a simplified form and is not intended to identify key features or essential characteristics of the claimed subject matter, nor is it intended to be used as an aid in determining the scope of the claimed subject matter. The selected aspects and embodiments are presented merely to provide the reader with a brief summary of certain forms the invention might take and are not intended to limit the scope of the invention. Other aspects and embodiments of the disclosure are described in the section of Detailed Description.

BRIEF DESCRIPTION OF THE DRAWINGS

These and various other features and advantages will become better understood upon reading of the following detailed description in conjunction with the accompanying drawings and the appended claims provided below, where:

DETAILED DESCRIPTION OF EMBODIMENTS

Embodiments of the disclosure provide a centralized control and management system for managing configurations of data collection and processing devices or programs in a computer network. The managed devices can be any devices performing various functions such as collecting data from servers and networks. The control and management system may include a server storing configuration data for all of the devices that it manages. By way of non-limiting example, the configuration data may be e.g. policy that instructs the managed devices on what data to be collected and where the data to be sent etc. While the policy can be complicated and may include hundreds or thousands of variables, and each managed device may have its own configuration different from the others, the control and management system of this disclosure can efficiently communicate configuration changes to the devices affected by the changes with minimal disruption on the other devices unaffected by the changes. For example, the control and management system of the disclosure can communicate configuration changes to only the affected devices and send only the delta configuration changes to the affected devices.

The control and management system of the disclosure uses Open Virtual Switch Database (OVSDB) protocol in exchange of communication between the configuration manager and the managed devices. The use of OVSDB protocol allows the solution to be highly scalable in managing a large number of devices. An OVSDB database schema maintained by an OVSDB server on the configuration manager may use table-based information exchange. The OVSDB database schema can be defined to map to the desired configuration. The OVSDB protocol allows the data in the table columns that is changed to be sent to an OVSDB client on a managed device. Each OVSDB client can subscribe and listen to only the table that is applicable to it, making the whole architecture scalable.

Referring to FIGS. 1-5, various embodiments of a system and method for managing configurations of data collection and processing devices will now be described. It should be noted that some figures are not necessarily drawn to scale. The figures are only intended to facilitate the description of specific embodiments, and are not intended as an exhaustive description or as a limitation on the scope of the disclosure. Further, in the figures and description, specific details may be set forth in order to provide a thorough understanding of the disclosure. It will be apparent to one of ordinary skill in the art that some of these specific details may not be employed to practice embodiments of the disclosure. In other instances, well known components or process steps may not be shown or described in detail in order to avoid unnecessarily obscuring embodiments of the disclosure. Further, in the description and appended claims, terms such as "data sensor or collector," "data processor," "manager," "device," or the like may be used for ease of describing various embodiments of the configuration management system of the disclosure. It will be understood by one of ordinary skill in the art that the terms "data sensor or collector," "data processor," "manager," "device," or the like refer to computer software or a software component implemented to preform one or more described functions, determinations, calculations, and/or operations of an overall system.

Figure 1:
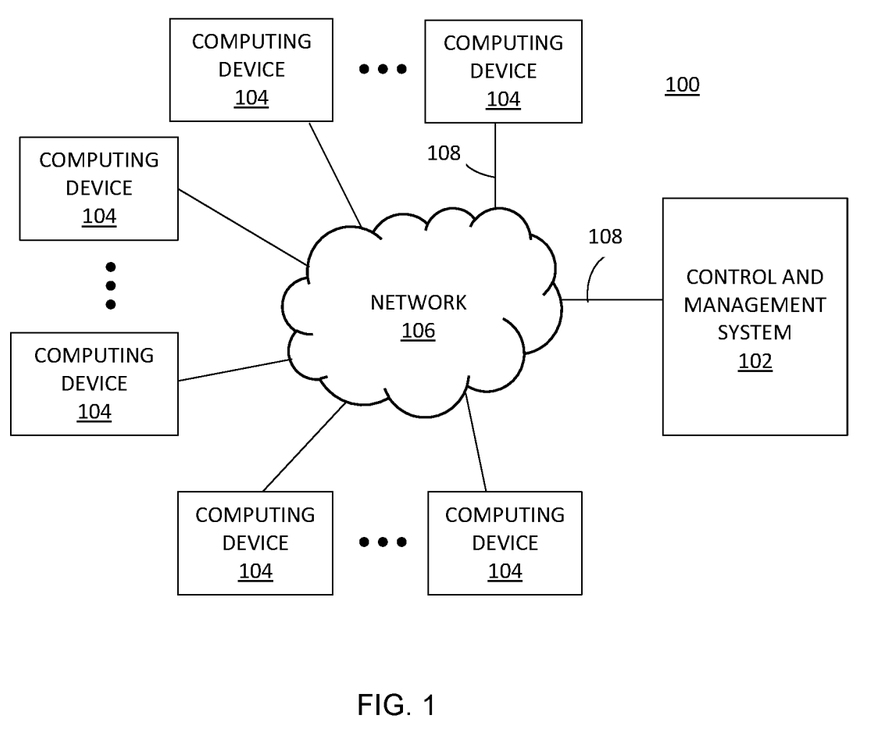
FIG. 1 is a block diagram illustrating an exemplary computer network in which the technique of configuration management of this disclosure can be implemented.

FIG. 1 is a block diagram illustrating a computing network 100 in which the techniques described herein can be employed. As shown, the computing network 100 may include a centralized control and management system 102 and a number of computing devices 104 interconnected via a network 106. The control and management system 102 may include a server computer that can provide the function of control and management including configuration management of data collection and processing devices as will be described in greater detail below. The computing devices 104 may be any devices that can be controlled or managed by the control and management system 102 to perform a desired function. By way of non-limiting example, the computing devices 104 can be personal computers, notebook computers, servers, storage devices, wireless devices, hand-held devices, routers, switches, or any other computing devices that can be connected to a network 106 in any manner.

The network 106 may be the Internet, an internal company intranet, a local area network (LAN), a wide area network (WAN), a wireless network, or any other network that can connect together the computing devices 104 and control and management system 102. In some embodiments, the network 106 is the Internet that connects together a very large number of widely distributed computing devices. In some embodiment, the network 106 is an intranet system at a large corporation connecting a plurality of distributed computing devices. If multiple corporate sites are involved, the distributed devices may be widely separated.

The computing devices 104 and the control and management system 102 may be connected to the network 106 through suitable communication links 108 respectively. The communication links 108 may be any technique for connecting into any portion of the network. Suitable communication links 108 include but are not limited to Ethernet connections, DSL connections, cable modem connections, modem dial-up connections, fiber optic connections, wireless connections, ISDN connections, routers, portal computers, and any other communication connections. It should be noted that the communication links 108 may allow for communication to occur, if desired, between any of the computing devices 104 and system 102 connected to the network 106. It should be further noted that the computing devices 104 may be connected to the network 106 in any other suitable ways. For example, the computing devices 104 may be connected to an intranet through a network switch or router and then connected to the Internet through a second router or portal computer. The control and management system 102 may also be connected to a company's intranet. The principle of the disclosed architecture and method can be implemented in a wide variety of network environments.

Figure 2:
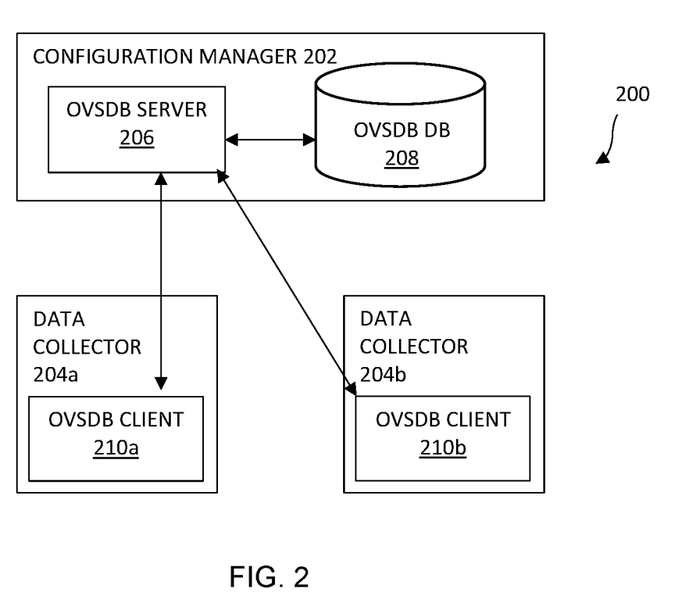
FIG. 2 is a block diagram illustrating an exemplary system or architecture which can be used to manage configurations of data collectors and/or processors according to embodiments of the disclosure.

FIG. 2 is a block diagram illustrating an exemplary system or architecture 200 according to embodiments of the disclosure. The system or architecture 200 can be used to manage data collection from a large number of computing devices in a distributed network shown in FIG. 1. As shown, the system 200 includes a configuration manager 202 residing on a server computer (e.g. 102 in FIG. 1) and a plurality of data collectors 204a, 204b residing on a plurality of computing devices (e.g. 104 in FIG. 1) in a distributed computing network. The configuration manager 202 includes an OVSDB server 206 maintaining an OVSDB database 208. Each of the plurality of data collectors 204a, 204b includes an OVSDB client 210a, 210b. The OVSDB database 208 on the configuration manager 202 comprises a database schema defining the configurations of the plurality of data collectors 204a, 204b. The OVSDB server 202 communicates with each of the plurality of OVSDB clients 210a, 210b on the data collectors 204a, 204b via the OVSDB protocol in managing the configurations of the plurality of data collectors 204a, 204b.

It should be noted that while only two data collectors are shown in FIG. 2 for ease of illustration and description of various embodiments, in practice there may be a large number of data collectors on a large number of computing devices distributed across a computing network as described in connection with FIG. 1. Further, while data collectors are shown in FIG. 2 in describing various embodiments, the system, architecture and principle described herein may equally apply to management of configurations of other devices for data collection and processing including data processors.

Figure 3:
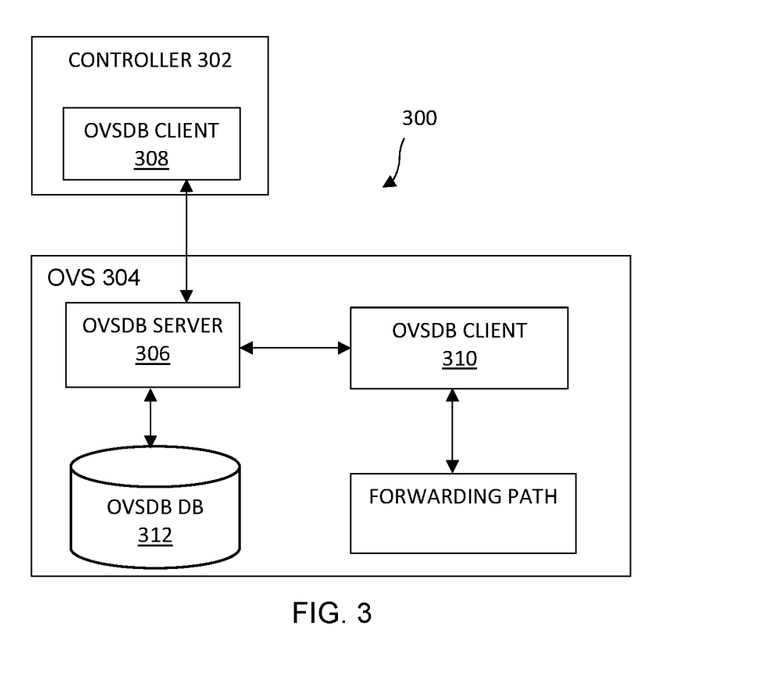
FIG. 3 is a block diagram illustrating a system or architecture in a software defined networking (SDN) environment.

OVSDB protocol is a management protocol known in software defined networking (SDN). Briefly and generally, the OVSDB protocol is part of Open vSwitch (OVS) implementation that provides programmatic network management interface. OVSDB protocol allows the control function in an SDN to be decoupled from the forwarding functions, enabling the forwarding functions to become directly programmable via a standard protocol such as OpenFlow. Open Networking Foundation (ONF) is an organization that provides standard for OpenFlow protocol, OVSDB protocol, and related technologies. FIG. 3 is a block diagram illustrating an SDN architecture 300 using the OVSDB protocol. In an SDN architecture 300 shown in FIG. 3, an SDN controller 302 is deployed together with an OVS 304. OpenFlow protocol is used to program flow entries on the OVS 304 and OVSDB protocol is used to configure the OVS 304 itself. Configuring OVS means creating, deleting, or modifying bridges, ports, interfaces, or the like. In the SDN environment 300, a centralized SDN controller 302 communicates to a number of OVS devices 304 that support OVSDB. An OVSDB server 306 runs on each of the OVS devices 304, and communicates with the OVSDB client 308 on the SDN controller 302 and an OVSDB client 310 on the OVS device 304 itself. The OVSDB server 306 stores and maintains an OVSDB database schema 312, which contains control and statistical information. The OVSDB client 310 on the OVS device 304 can monitor the OVSDB database 312 for additions, deletions and modifications to the stored information, which is used for various purpose, such as learning the media access control (MAC) addresses of virtual hosts and physical servers. The OVSDB database schema 312 provides a means through which the OVS device 304 and SDN controller 302 can exchange information. For example, the network OVS device 304 may capture MAC routes to entities in the physical network and push the information into a table in the OVSDB database schema 312 so that the SDN controller 302 with an OVSDB client 308 running can access the MAC routes.

In accordance with embodiments of this disclosure as shown in FIG. 2, a system 200 includes an OVSDB server 206 on a configuration manager 202, and a plurality of OVSDB clients 210a, 210b running on a plurality of data collectors 204a, 204b. This is in contrast to an SDN architecture 300 shown in FIG. 3 where an OVSDB server 306 is running on each of the plurality of OVS devices 304 and an OVSDB client 308 is running on the centralized SDN controller 302.

Referring to FIG. 2, the OVSDB server 206 maintains an OVSDB database 208 on the configuration manager 202. The OVSDB database 208 defines configurations for each of the plurality of data collectors 204a, 204b managed by the configuration manager 202. Configuration of a data collector refers to a set of commands and parameter values that define how the data collector operates. By way of non-limiting example, configuration for a data collector may include policy that instructs the data collector on what data to be collected and where the data to be sent. The policy or other configuration data may include hundreds or even thousands of variables. Each data collector may have its own configurations different from others in the network. Over time, circumstances may require that the configuration of a data collector be updated to reflect e.g. a change in the policy, an addition or deletion of a policy, and so on. The system or architecture shown in FIG. 2 can be advantageously used to manage configurations of data collectors on a large number of computing devices in a highly efficient and scalable way.

The OVSDB database schema 208 may include a plurality of tables each defining configurations applicable to one or more data collectors 204a, 204b managed by the configuration manager 202. The OVSDB server 202 can write on the plurality of tables, e.g. add, delete, or modify entries on the tables, thereby providing a centralized management of configurations of data collectors on a large number of computing devices in a distributed network.

Table 1 schematically shows an exemplary OVSDB database schema for defining configurations of data sensors or collectors.

TABLE 1

Schema for Data Collectors

| sensor_id | conf1 | conf2 | . . . | conf_n |

As shown, the exemplary OVSDB database schema table may include a plurality of columns. The column of "sensor_id" provides identification for data collectors whose configuration data are specified in the table. Each of the data collectors has a unique identifier in the table under the column of "sensor_id". The columns of "conf1," "conf2," "confn" specify the types or categories of configurations applicable to the data collectors identified in the table. By way of non-limiting example, conf1 may specify which data is to be collected, conf2 may specify where the collected data to be sent, and so on. Therefore, an OVSDB database table may include a plurality of rows and columns. Each row includes a value or data of configuration under "conf1," "conf2," . . . "confn" for a data collector identified under "sensor_id."

Table 2 schematically illustrates rows of data or values for data collectors 204 "a" and "b" in an OVSDB database schema table as shown in Table 1. In practice, the system 200 may manage a large numbers of data collectors on a large number of computing devices, and the Data Collector Table may include a large number of rows of data for the data collectors managed.

TABLE 2

Data for Data Collectors "a" and "b"

| "a" | conf_a1 | conf_a2 | . . . | conf_an |
| "b" | conf_b1 | conf_b2 | . . . | conf_bn |

An OVSDB client on a data collector may establish e.g. a TCP connection with the OVSDB server on the configuration manger, and notify the OVSDB server which configuration data in the tables it is interested in. An OVSDB client may subscribe to an OVSDB database table conditionally. A conditional subscription of an OVSDB client notifies the OVSDB server request criteria, and the OVSDB server sends to the OVSDB client only configuration data that match the request criteria, such as sending data in a particular row in the table.

For example, an OVSDB client 210 on a data collector 204 may subscribe to the data in Data Collector Table with the sensor_id equal to or same as the sensor id for the particular data collector. For example, when data collector "a" connects to the OVSDB server, data collector "a" subscribes configuration data from Data Collector Table with the criteria sensor_id equal to "a." Therefore, when there is a change in value under column "conf2" e.g. from conf_a2 to conf_a2_new, the OVSDB server will notify the OVSDB client on data collector "a" that column conf2 value is changed from conf_a2 (old value) to conf_a2_new (new value). If the configuration value for row "b" is changed e.g. from conf_b2 to conf_b2_new, the OVSDB server will not notify or send the change to data collector "a" because data collector "a" does not subscribe to the row data with the criteria sensor_id equal to "b" and therefore, any change in row data with sensor id "b" does not apply to data collector "a."

In some embodiments, an OVSDB client 210 on a data collector 204 may keep a connection open with the OVSDB server 202. As such, whenever there is a change in that table, e.g. when an entry is modified, deleted, or added, the change will be sent to the OVSDB client 210 on the data collector 204. According to embodiments of the disclosure, only the delta configuration change or (new value−old value) is sent to an OVSDB client. If an entry in the database table is modified, the information that is sent to the OVSDB client will be only the entry with which the columns is modified, instead of sending all the configuration data in that row to the OVSDB client every time when there is change made to that row. In this manner, the OVSDB server 206 can send concise information e.g. delta configuration change to an OVSDB client 210, allowing management of a large number of data collectors in a scalable way.

Table 3 schematically shows another example OVSDB database schema table according to embodiments of the disclosure.

TABLE 3

Rule Table

| rule_id | ip | port | . . . | protocol |

As shown, the exemplary Rule Table may include a plurality of columns. The column of "rule_id" provides identification of specific rules for collecting network traffic by a data collector. A number of columns such as "ip," "port," and "protocol" etc. specify the IP address, port number, and protocol of the traffic packet applicable to an identified collection rule. Table 4 schematically illustrates rows of data for rules id "1" and "2" applicable a data collector. In practice, a Rule Table may include many rules applicable to a data collector.

TABLE 4

Rule Table Data:

| 1 | 192.168.1.80 | 80 | . . . | TCP |
| 2 | 172.16.100.5 | 23 | . . . | UDP |

Therefore, in some embodiments of the disclosure, an OVSDB client 210 on a data collector 204 may subscribe to an OVSDB database table unconditionally. An unconditional subscription of an OVSDB client to an OVSDB database table subscribes all of the rows in the table. For example, when a data collector e.g. "a" connects to the OVSDB server, it may subscribe the Rule Table "unconditionally" or subscribe all of the rows in the Rule Table. Therefore, any changes in configuration data with "rule_id" of both "1" and "2" will be sent to the data collector "a." For example, if the rule "1" has a change under the column of "port" from 80 to 8888, the OVSDB server will notify the OVSDB client on data collector "a" that the rule with id "1" has changed the Port value from 80 (old value) to 8888 (new value). If the rule "2" also has changes under the column of "protocol," the OVSDB server will also notify the OVSDB client on data collector "a" of the changes made to the rule "2."

It is noted that the system 200 shown in FIG. 2 applies to both physical and virtual computing network. For example, in some embodiments, a data collector with an OVSDB client may reside on a physical computing device. In some embodiments, a data collector with an OVSDB client may reside on a virtual machine or container in a virtualized computing network.

Figure 4:
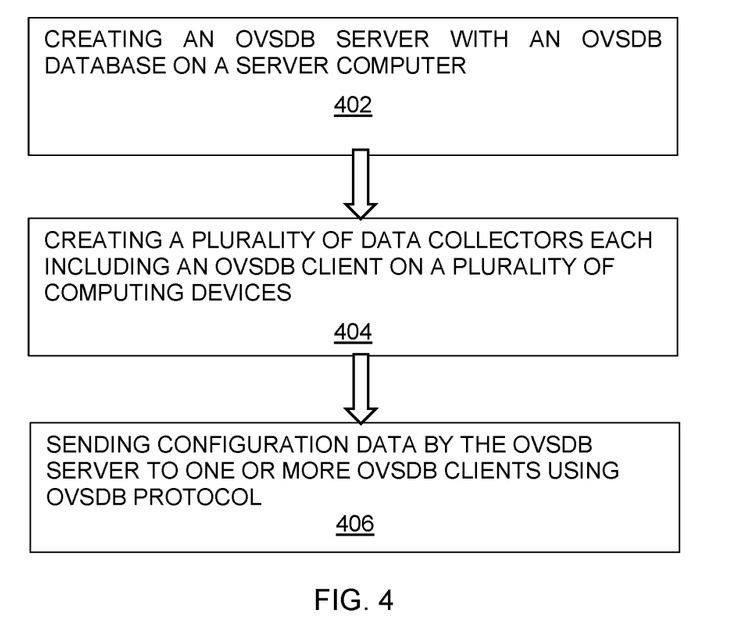
FIG. 4 is a flowchart illustrating a computer-implemented method of managing device configurations according to embodiments of the disclosure.

FIG. 4 is a flowchart illustrating a method of managing configurations of data collection according to embodiments of the disclosure. The method can be implemented in a network architecture shown in FIG. 2 or similar or any other suitable architectures. In general, according to the method, an OVSDB server with an OVSDB database is created on a server computer (Block 402). At Block 404, a plurality of data collectors each including an OVSDB client are created on a plurality of computing devices in a distributed computer network. The OVSDB database on the server computer includes a database schema defining configuration data for the plurality of data collectors. At Block 406, configuration data is sent by the OVSDB server to one or more OVSDB clients on one or more data collectors using the OVSDB protocol.

While not shown in FIG. 4, in some embodiments, the configuration data applicable to one or more of the plurality of data collectors may be changed, and the changed configuration data can be sent by the OVSDB server to only the one or more of the plurality of data collectors affected by the change.

The OVSDB database may include a plurality of tables. Each of the plurality of tables may include multiple rows and multiple columns specifying configuration data applicable to one or more of the plurality of data collectors. In some embodiments, at least one of the plurality of tables comprises a plurality of rows, each row comprising a unique identifier and configuration data for one of the plurality of data collectors identified by the unique identifier. In such embodiment, only configuration data that has been changed in a row may be sent to a data collector identified in the row.

In some embodiment, at least one of the plurality of tables comprises a plurality of rows, each row comprising rules for data collection applicable to a data collector. In such embodiments, configuration data that has been changed in any of plurality of rows may be sent to the data collector.

Various embodiments of a method of managing configurations of data collection are described in connection with FIG. 4. It will be appreciated that more or fewer steps, actions, or processes may be incorporated into the method without departing from the scope of the disclosure. No particular order is implied by the arrangement of blocks shown and described herein. The invention may be in the form of a computer product comprising a computer-readable medium storing or carrying instructions which, when executed by a computer processor, cause the computer processor to perform the methods described in the disclosure. The instructions may be implemented as software code to be executed by a processor using any suitable computer language such as, Java, C++ or Perl using, e.g. conventional or object-oriented techniques. The computer-readable medium may include any suitable medium that is capable of storing or encoding a sequence of instructions for execution by the computer processor and that causes the computer processor to perform any one of the methodologies of the present invention. The computer-readable medium shall accordingly include, but not be limited to, solid-state memories, optical and magnetic disks. Examples of computer-readable medium include volatile and nonvolatile, removable and non-removable media for storage of computer-readable instructions. By way of non-limiting example, the computer-readable medium includes random access memory (RAM), read only memory (ROM), electrically erasable programmable ROM (EEPROM) flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information. In some embodiments, the instructions or software program may be encoded and transmitted using carrier signals adapted for transmission via wired, optical, and/or wireless networks conforming to a variety of protocols, including the Internet. As such, a computer-readable medium may be created using a data signal encoded with such programs. A computer-readable medium encoded with the program code may be packaged with a compatible device or provided separately from other devices e.g. via Internet download. Further, any such computer-readable medium may reside on or within a computer product e.g. a hard drive, a CD, or an entire computer system.

Figure 5:
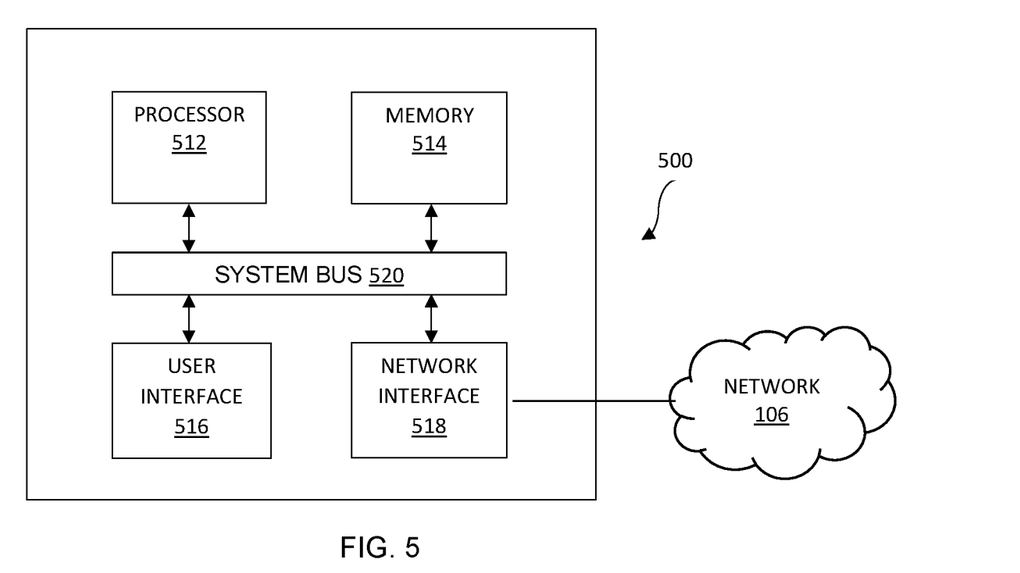
FIG. 5 a block diagram illustrating an exemplary computing device on which embodiments of the disclosure can be implemented.

FIG. 5 schematically illustrates a computing apparatus 500 upon which embodiments of the disclosure can be performed. The computer apparatus 500 can be used as either a server computer on which an OVSDB server is running or a computing device on which an OVSDB client is running. As another example, the computer apparatus 500 can be used to host a virtualization environment that supports a plurality of virtual machines. The computing apparatus 500 generally includes a processor 512, a memory device 514, a user interface 516, and a network interface 518, each of which is coupled to a system bus 520.

The processor 512 may include a central processing unit (CPU) that is generally known in the art, such as an INTEL® processor or an AMD® processor, or a graphical processing unit (GPU), such as an NVIDIA® GPU, or other type of processing unit. The processor 512 may retrieve and execute computer-executable instructions from the memory 514, which may cause the processor 512 to perform any of the methods and/or steps according to the embodiments of this disclosure described above.

The memory 514 may include any one of or a combination of volatile memory elements and nonvolatile memory elements. The memory 514 may include a random-access memory (RAM) or other dynamic storage device for storing information and instructions to be executed by the processor 512, and for storing temporary variables or other intermediate information during execution of instructions by the processor 512. The memory 514 may also include read-only memory (ROM) or other static storage device for storing static information and instructions for the processor 512. The memory 514 may further include a data storage device such as a magnetic disk or optical disk, for storing information and instructions. The memory 514 (e.g. a non-transitory computer-readable medium) may comprise programs (logic) for operating the computer system and for performing other applications. The memory 514 may include an OVSDB database.

The user interface device 516 may include components with which a user interacts with the computer apparatus 500, such as a keyboard, pointing device, pen, touch input device, voice input device, or the like. Output devices such as a display device, printer, speaker etc. may also be included in the computer apparatus 500.

The network interface 518 allows the computer system to communicate with other devices or systems over a communication network 106 such as the Internet or an intranet (e.g., a local area network). The network interface 518 may include a Wi-Fi interface, Ethernet interface, Bluetooth interface, or other wireless or wired interfaces. The network interface 518 allows the computer apparatus 500 to receive and send electrical, electromagnetic or optical signals that carry data streams representing various types of information. For instance, the network interface 518 may allow the computer apparatus 500 to receive data streams representing software programs for configuration management over the communication network 106.

All technical and scientific terms used herein have the meaning as commonly understood by one of ordinary skill in the art unless specifically defined otherwise. As used in the description and appended claims, the singular forms of "a," "an," and "the" include plural references unless the context clearly dictates otherwise. The term "or" refers to a nonexclusive "or" unless the context clearly dictates otherwise. Further, the term "first" or "second" etc. may be used to distinguish one element from another in describing various similar elements. It should be noted the terms "first" and "second" as used herein include references to two or more than two. Further, the use of the term "first" or "second" should not be construed as in any particular order unless the context clearly dictates otherwise.

Those skilled in the art will appreciate that various other modifications may be made. All these or other variations and modifications are contemplated by the inventors and within the scope of the invention.

What is claimed is:

1. A system for configuration management of devices in a distributed computer network, comprising:
 a configuration manager comprising an OVSDB server maintaining an OVSDB database on a server computer; and
 a plurality of devices on a plurality of computing devices, each of the plurality of devices comprising an OVSDB client,
 wherein the OVSDB database on the configuration manager comprises a database schema containing configuration data for the plurality of devices, and the OVSDB server on the configuration manager communicates with the OVSDB client on each of the plurality of devices via OVSDB protocol in managing configurations of the plurality of devices,
 wherein the OVSDB database schema comprises a plurality of tables, a portion of each of the plurality of tables specifying configuration data applicable to different ones of the plurality of devices, such that configurations of different individual devices of the plurality of devices are presented in different corresponding portions of the plurality of tables,
 wherein an individual device of the plurality of devices subscribes, via a corresponding OVSDB client of the individual device, to data included in the OVSDB database corresponding to a request criteria, the request criteria corresponding with a portion of each of the plurality of tables specifying configuration data applicable to the individual device, and wherein the OVSDB server on the configuration manager is configured to automatically send, to the individual device via the corresponding OVSDB client and responsive to changes made to the plurality of tables, only configuration data that has been changed in the portions corresponding to the request criteria, the configuration data enabling the individual device to update its configuration.

2. The system of claim 1, wherein at least one of the plurality of tables comprises a plurality of rows each row comprising a unique identifier and configuration data for one of the plurality of devices identified by the unique identifier.

3. The system of claim 1, wherein at least one of the plurality of tables comprises a plurality of rows each row comprising rules applicable to the device.

4. The system of claim 3, wherein the OVSDB server is programed to send only configuration data that has been changed in any of plurality of rows to the device.

5. The system of claim 1, wherein at least one of the plurality of devices comprises a data collector.

6. The system of claim 1, wherein at least one of the plurality of devices comprises a data processor.

7. The system of claim 1, wherein at least one of the plurality of computing devices comprises a physical computer.

8. The system of claim 1, wherein at least one of the plurality of computing devices comprises a virtual machine.

9. The system of claim 1, wherein at least one of the plurality of computing devices comprises a container in a virtual computing network.

10. A computer-implemented method, comprising:

creating an OVSDB server with an OVSDB database on a server computer;

creating a plurality of devices each including an OVSDB client on a plurality of computing devices in a distributed computer network, wherein the OVSDB database on the server computer contains configuration data for the plurality of devices, and wherein the OVSDB database schema comprises a plurality of tables, a portion of each of the plurality of tables specifying configuration data applicable to different ones of the plurality of devices, such that configurations of different individual devices of the plurality of devices are presented in different corresponding portions of the plurality of tables;

subscribing, by an individual device of the plurality of devices, via a corresponding OVSDB client of the individual device, to data included in the OVSDB database corresponding to a request criteria, the request criteria corresponding with a portion of each of the plurality of tables specifying configuration data applicable to the individual device; and sending configuration data by the OVSDB server to the OVSDB client on the individual device using OVSDB protocol, wherein the OVSDB server is configured to automatically send, to the individual device via the corresponding OVSDB client and responsive to changes made to the plurality of tables, only configuration data that has been changed in the portions corresponding to the request criteria, the configuration data enabling the individual device to update its configuration.

11. The computer-implemented method of claim 10, further comprising changing configuration data in the OVSDB database applicable to one or more of the plurality of devices, and sending the changed configuration data by the OVSDB server to only the one or more of the plurality of devices affected by the change.

12. The computer-implemented method of claim 10, wherein at least one of the plurality of tables comprises a plurality of rows each row comprising a unique identifier and configuration data for one of the plurality of devices identified by the unique identifier.

13. The computer-implemented method of claim 10, wherein at least one of the plurality of tables comprises a plurality of rows comprising rules applicable to the device.

14. The computer-implemented method of claim 10, wherein the plurality of the devices comprise at least a data collector and/or a data processor.

15. A non-transitory computer-readable medium storing program code that, when executed by one or more processors, directs a computing system to manage configuration of devices in a distributed computer network, the program code comprising instructions for:

creating an OVSDB server with an OVSDB database on a server computer;

creating a plurality of devices each including an OVSDB client on a plurality of computing devices in a distributed computer network, wherein the OVSDB database on the server computer contains configuration data for the plurality of devices, and wherein the OVSDB database schema comprises a plurality of tables, a portion of each of the plurality of tables specifying configuration data applicable to different ones of the plurality of devices, such that configurations of different individual devices of the plurality of devices are presented in different corresponding portions of the plurality of tables;

subscribing, by an individual device of the plurality of devices, via a corresponding OVSDB client of the individual device, to data included in the OVSDB database corresponding to a request criteria, the request criteria corresponding with, to a portion of each of the plurality of tables specifying configuration data applicable to the individual device; and sending configuration data by the OVSDB server to the OVSDB client on the individual device using OVSDB protocol, wherein the OVSDB server is configured to automatically send, to the individual device via the corresponding OVSDB client and responsive to changes made to the plurality of tables, only configuration data that has been changed in the portions corresponding to the request criteria, the configuration data enabling the individual device to update its configuration.

16. The non-transitory computer-readable medium of claim 15, wherein the program code further comprises instructions for changing configuration data in the OVSDB database applicable to one or more of the plurality of devices, and sending the changed configuration data by the OVSDB server to only the one or more of the plurality of devices affected by the change.

17. The non-transitory computer-readable medium of of claim 15, wherein
at least one of the plurality of tables comprises a plurality of rows each row comprising a unique identifier and configuration data for one of the plurality of devices identified by the unique identifier.

18. The non-transitory computer-readable medium of claim 15, wherein
at least one of the plurality of tables comprises a plurality of rows each row comprising rules for data collection applicable to the device.

19. The non-transitory computer-readable medium of claim 15, wherein the plurality of the devices comprise at least a data collector and/or a data processor.

* * * * *